United States Patent [19]

Iizuka

[11] Patent Number: 5,453,807
[45] Date of Patent: Sep. 26, 1995

[54] LENS WITH MOVEABLE DIAPHRAGM

[75] Inventor: Toshimi Iizuka, Kanagawa, Japan

[73] Assignee: Canon Kabushiki Kaisha, Tokyo, Japan

[21] Appl. No.: 333,357

[22] Filed: Nov. 2, 1994

Related U.S. Application Data

[63] Continuation of Ser. No. 7,611, Jan. 22, 1993, abandoned.

[30] Foreign Application Priority Data

Jan. 31, 1992 [JP] Japan ..................... 4-046264

[51] Int. Cl.$^6$ ................................ G03B 1/18
[52] U.S. Cl. .................. 354/195.1; 354/286; 359/696; 359/823
[58] Field of Search .............. 354/195.1, 195.11, 354/286, 271.1, 446; 359/696, 697, 698, 823, 825, 827, 703

[56] References Cited

U.S. PATENT DOCUMENTS

| | | | |
|---|---|---|---|
| 4,596,454 | 6/1986 | Kawai et al. | 354/286 |
| 4,793,689 | 12/1988 | Aoyagi et al. | 354/271.1 X |
| 5,077,569 | 12/1991 | Notagashira et al. | 354/286 X |
| 5,335,115 | 8/1994 | Kawai et al. | 359/696 |

Primary Examiner—Howard B. Blankenship
Attorney, Agent, or Firm—Robin, Blecker, Daley & Driscoll

[57] ABSTRACT

A lens barrel includes a moving lens arranged to be movable around an optical axis as well as in the direction of the optical axis, an electrically-driven diaphragm device arranged to move around the optical axis as well as in the direction of the optical axis in association with the movement of the moving lens, and a flexible wiring member arranged to electrically connect the electrically-driven diaphragm device to an electric circuit board.

10 Claims, 3 Drawing Sheets

LENS WITH MOVEABLE DIAPHRAGM

This is a continuation application under 37 CFR 1.62 of prior application Ser. No. 08/007,611, filed Jan. 22, 1993, now abandoned.

BACKGROUND OF THE INVENTION

1 Field of the Invention

This invention relates to a tens barrel having an electrically-driven diaphragm device.

2. Description of the Related Art

The conventional lens barrel of the kind mentioned above has been arranged, as described in the specification of U.S. Pat. No. 4,326,789, to have the diaphragm device driven by a driving power coming from a camera body through an automatic aperture control lever which is a mechanical interlock member.

FIG. 2 is a vertical section showing a lens barrel of a novel type which has been proposed. Referring to FIG. 2, a guide tube 3 carries a lens L1. The guide tube 3 is provided with a guide slot 3b which extends along an optical axis and a roller 3c which is secured to the guide tube 3. A middle tube 4 carries an optical system which consists of a lens L2 and an electrically-driven diaphragm device 38. A roller 5 is secured to the middle tube 4. A cam tube 28 is rotatably carried by the outer side of the guide tube 3. The cam tube 28 is provided with a cam slot 28a which has the roller 5 inserted into it in such a way as to be movable without rattling. A circumferential slot 28b extends in the circumferential direction of the cam tube 28 in such a way as to have the roller 3c of the guide tube 3 fitted therein and to limit the movement of the cam tube 28 in the direction of the optical axis. A pin 29 which is secured to the cam tube 28 is pinched by a fork-like metal piece 30 in such a way as to revolve together with the fork-like metal piece 30.

In the lens barrel, the fork-like metal piece 30 is arranged to be driven to rotate by a vibratory wave motor M via a rubber ring 21, a rotation transmission ring 22, a differential ring 23, a shaft screw 24 and a roller 25. The cam tube 28 is arranged to be caused by the vibratory wave motor M, via the fork-like metal piece 30, to rotate around the optical axis. When the cam tube 28 is thus rotated, the roller 5 which is fitted in an intersection point between the guide slot 3b and the cam slot 28a is guided to move in the direction of the optical axis together with the middle tube 4.

FIG. 3 is a vertical section showing a conventional lens barrel. Referring to FIG. 3, a middle tube 31 carries an optical system which consists of lenses L1 to L6 and a diaphragm device 38. The middle tube 31 is provided with a thread part 31a on the outer side thereof for drawing the optical system outward. A rotary ring 32 has thread parts formed both on its inner and outer sides and is screwed to a fixed tube 34 by the outer thread part. A key way 31b is formed in the middle tube 31 in parallel to the optical axis. A key 35 which is secured to the fixed tube 34 is fitted without play in the key way 31b. An operation member 33 is unified with the rotary ring 32. A ball bearing 37 is arranged to carry an automatic aperture control lever 36 in such a way as to allow it to freely rotate around the optical axis. A lever 39 is arranged to open or close the aperture of the diaphragm device 38. A mount 40 is provided for coupling with a camera body which is not shown.

When the operation member 33 is rotated in the structural arrangement mentioned above, the rotary ring 32 rotates to act on the middle tube 31 which is screwed to the inner side of the rotary ring 32. Since the key 35 allows the middle tube 31 to move only in the direction of the optical axis, the optical system which consists of the lenses L1 to L6 and the diaphragm device 38 and which is carried by the middle tube 31 is caused by the rotation of the operation member 33 to move in the direction of the optical axis. When a force is exerted from the camera body on the automatic aperture control lever 36, the lever 36 turns around the optical axis O to transmit a turning force to the diaphragm operating lever 39. The aperture of the diaphragm device 38 thus can be opened and closed by the turning movement of the lever 39.

The arrangement of the conventional lens barrel shown in FIG. 3, however, necessitates an arrangement to drive the diaphragm device from the camera body through a mechanical connection member and to move straight the diaphragm device or the lens group including the diaphragm device in the direction of the optical axis. It is of course conceivable to move them by a mechanical connecting arrangement including some rotating movement. However, this method makes the structural arrangement too complex and hardly practicable.

As to the arrangement to move straight the diaphragm device, etc., it is generally practiced to make a forward movement by a double screw arrangement as shown in FIG. 3 or to arrange a cam tube in combination with a guide tube as shown in FIG. 2. However, these methods have presented a problem that they hinder a reduction in size and manufacturing cost of the lens barrel.

SUMMARY OF THE INVENTION

It is an object of this invention to provide a lens barrel which is capable of drawing out an optical system with an extremely simple structural arrangement.

To attain this object, a lens barrel which is arranged according to this invention comprises a moving lens arranged to move in the direction of an optical axis while rotating around the optical axis so as to perform a focusing or power varying action, an electrically-driven diaphragm device arranged to move in the direction of the optical axis while rotating around the optical axis in accordance with the focusing or power varying action of the moving lens, a driving circuit arranged within the lens barrel for driving the electrically-driven diaphragm device, and a flexible wiring member arranged to electrically connect the electrically-driven diaphragm device to the driving circuit.

The above and other objects and features of this invention will become apparent from the following detailed description of an embodiment thereof taken in connection with the accompanying drawings.

DETAILED DESCRIPTION OF THE PREFERRED EMBODIMENT

Figure 1:
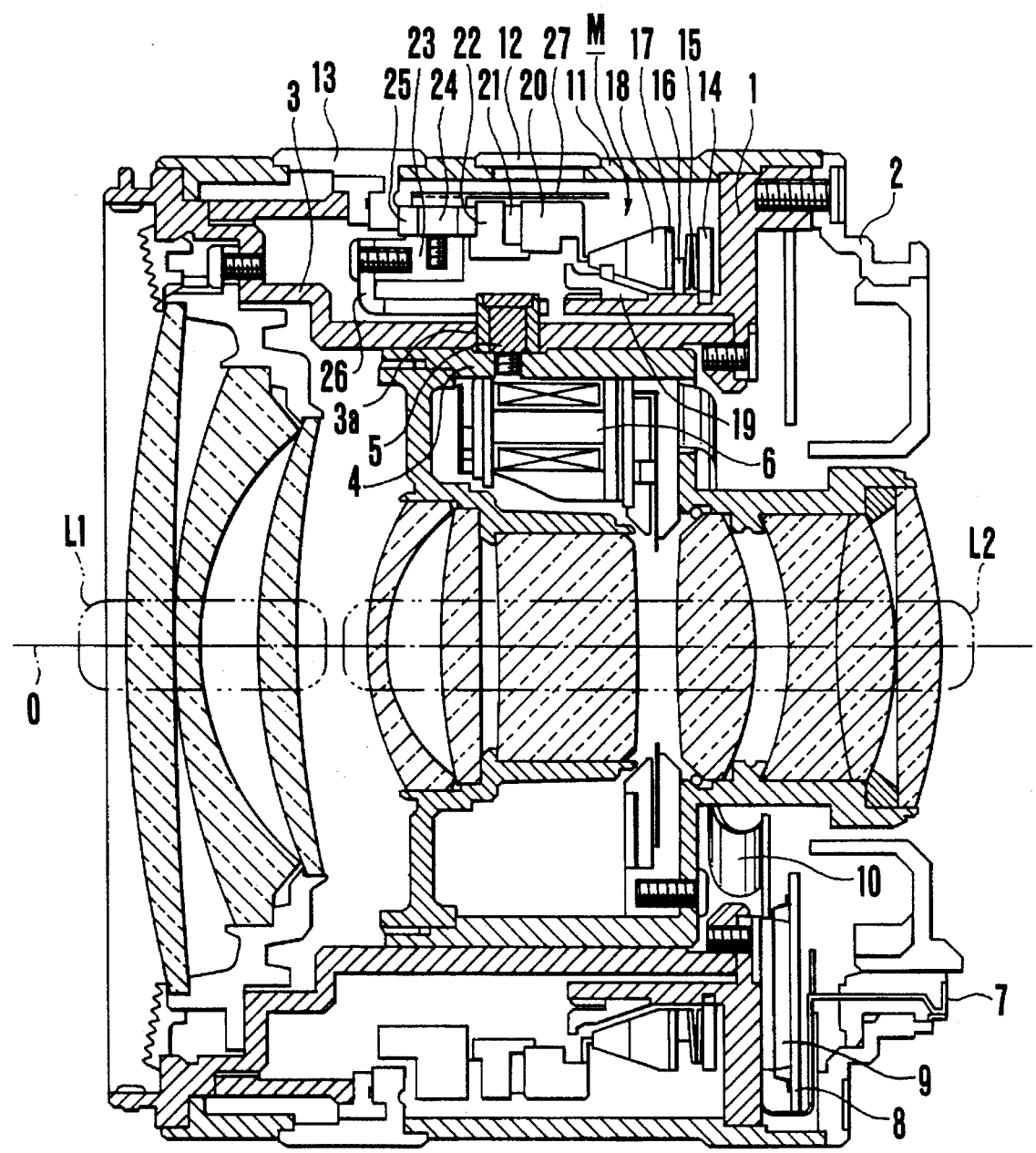
FIG. 1 is a vertical section showing a lens barrel arranged as an embodiment of this invention.
Figure 2:
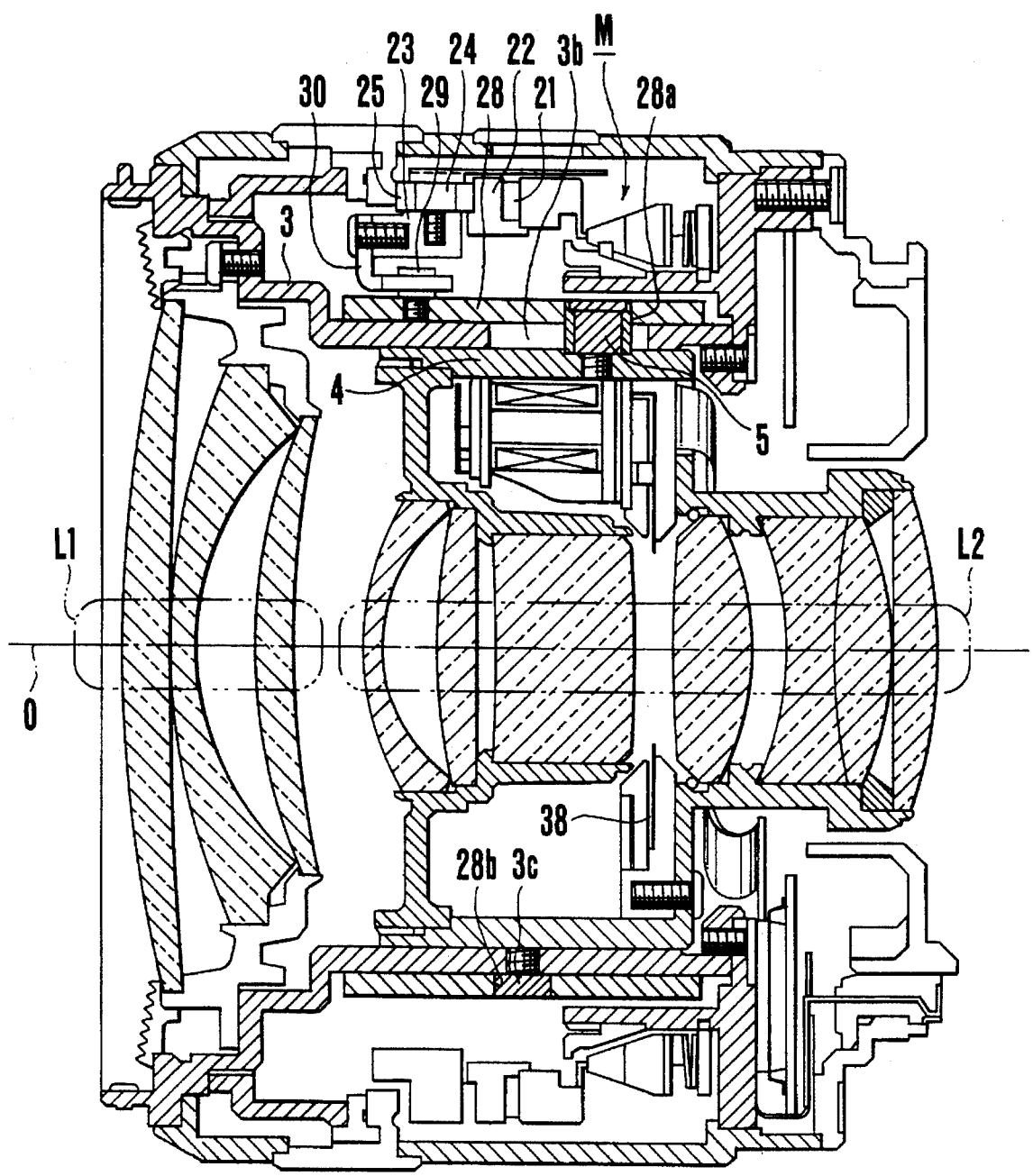
FIG. 2 is a vertical section showing a lens barrel which serves as a premise of this invention.
Figure 3:
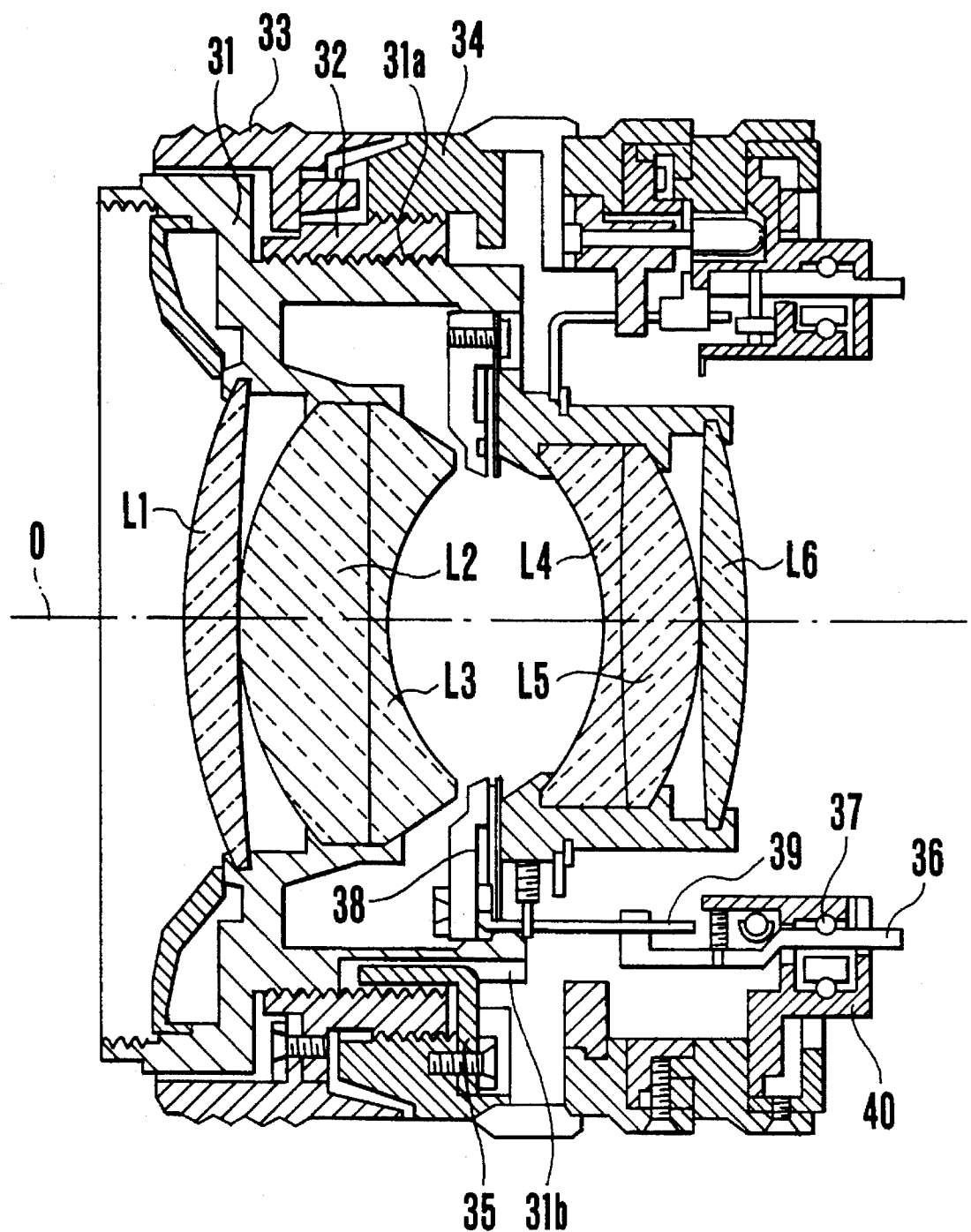
FIG. 3 is a vertical section showing an example of the conventional lens barrel.

The features of this invention are best represented by FIG. 1 which shows in a vertical section a lens barrel arranged as an embodiment of the invention. Referring to FIG. 1, the illustration includes a fixed lens L1, a focusing movable lens L2, a fixed tube 1, a mount 2 which is secured to the fixed tube or member 1 and arranged for coupling with a camera body (not shown), a guide tube 3 which is attached to the fixed tube 1 by screws, a cam slot 3a formed in the guide tube 3, a middle tube 4 fitted into the inside of the guide tube 3, a roller 5 (a cam follower) which is radially arranged and secured to the outer circumference of the middle tube 4 and movably fitted into the cam slot 3a of the guide tube 3 without play, an electrically-driven diaphragm device 6, a mount contact 7 for electrical connection with the camera body, and an electrical circuit board 8 which is carried by a stationary part within the lens barrel.

An IC 9 is provided for driving the diaphragm device 6. A flexible printed circuit board 10 is arranged to electrically connect the electrically-driven diaphragm device 6 to the electrical circuit board 8. This flexible printed circuit board 10 is arranged in a state of being warped approximately into a U shape in such a way as to allow the electrically-driven diaphragm device 6 to move in the direction of the optical axis and also around the optical axis. The illustration further includes an outer tube 11, a distance graduation window 12, a manual focusing ring 13, a Belleville spring retainer 14, a Belleville spring 15, a vibration absorber 16, an electrostrictive element 17, a vibration member 18, a vibration member rotation stopping member 19, a rotor 20, a rubber ring 21, and a rotation transmission ring 22. Moving means M which includes a vibratory wave motor is formed by the above-stated parts 16 to 22.

Shaft screws 24 are radially arranged and fixed at three points to the outer circumference of a differential ring 23. Rollers 25 are rotatably fitted on the shaft screws 24. A fork-like metal piece 26 is screwed to the differential ring 23. A distance graduation plate 27 is stuck to the differential ring 23.

The electrically-driven diaphragm device 6 is arranged in a known manner, for example, as disclosed in U.S. Pat. No. 4,874,233, etc. Therefore, the details of the diaphragm device 6 are omitted from description. Further, in the case of this embodiment, an annular-type vibratory wave motor is employed as an actuator for automatic focusing. However, the embodiment includes a manual focusing device to permit manual focus adjustment in addition to the automatic focus adjustment.

The details of the vibratory wave motor and the manual focusing device are, for example, as disclosed in U.S. Pat. No. 5,335,115. They are arranged as follows: When a voltage is applied to the electrostrictive element 17 by a control circuit which is not shown, vibrations propagating in the direction of circumference take place in the vibration member 18. The vibrations of the vibration member 18 cause the rotor 20, the rubber ring 21 and the rotation transmission ring 22 to rotate around the optical axis. This rotation causes the rollers 25 to revolve around the optical axis O together with the shaft screws 24 and the differential ring 23 while rotating on the shaft screws 24.

Since the roller 5 is pinched by the fork-like metal piece 26 which is secured to the differential ring 23, the rotation of the differential ring 23 causes the middle tube 4 to move in the direction of the optical axis while rotating under the guide of the cam slot 3a provided in the guide tube 3, so that a focusing action can be accomplished. In this instance, since the electrical circuit board 8 is connected through the flexible printed circuit board 10 to the electrically-driven diaphragm device 6, the flexible printed circuit board 10 never hinders the electrically-driven diaphragm device 6 from moving forward while rotating.

As described above, the embodiment is arranged to enable the electrically-driven diaphragm device which is arranged to move in the direction of the optical axis within a phototaking lens to be drawn out while rotating. This arrangement obviates the necessity of the double screw arrangement and the use of a rotary cam tube. As a result, the drawing-out mechanism of the lens barrel is extremely simplified to permit a reduction in size and manufacturing cost of the photo-taking lens barrel.

Further, since the electrically-driven diaphragm device is electrically connected to the electrical circuit board by the flexible printed circuit board, the diaphragm device can be moved in the direction around the optical axis as well as in the direction of the optical axis without hindrance.

What is claimed is:

1. A lens barrel comprising:
    a) a fixed member;
    b) a moving lens movable in the direction of an optical axis and rotatable around the optical axis relative to said fixed member;
    c) an electrically-driven diaphragm device arranged to be movable in the direction of the optical axis and rotatable around the optical axis relative to said fixed member in association with the movement of said moving lens; and
    d) a flexible member for electrically connecting said electrically-driven diaphragm device to an electrical circuit board.

2. A lens barrel according to claim 1, wherein said electrically-driven diaphragm device is secured to a holding member which carries said moving lens.

3. A lens barrel according to claim 1, wherein said moving lens is arranged to perform a focusing action by being displaced in the direction of the optical axis.

4. A lens barrel according to claim 1, wherein a flexible printed circuit board is employed as said flexible member, and wherein said electrically-driven diaphragm device is arranged to be allowed to move in the direction of the optical axis and around the optical axis by connecting said electrically-driven diaphragm device to said electrical circuit board with said flexible printed circuit board warped approximately into a U shape.

5. A lens barrel according to claim 1, further comprising a motor which serves as a drive source for moving said moving lens.

6. A lens barrel according to claim 5, wherein a vibratory wave motor is employed as said motor.

7. A lens barrel according to claim 3, further comprising a fixed lens disposed in front of said moving lens on the optical axis.

8. A lens barrel comprising:
    a fixed member;
    an electrically-driven diaphragm device arranged to be movable in the direction of an optical axis and rotatable around the optical axis relative to said fixed member in association with the movement of a moving lens; and
    a flexible member for electrically connecting said electrically-driven diaphragm device to an electrical circuit board.

9. A lens barrel according to claim 8, wherein a flexible printed circuit board is employed as said flexible member, and wherein said electrically-driven diaphragm device is arranged to be allowed to move in the direction of the optical axis and around the optical axis by connecting said electrically-driven diaphragm device to said electrical circuit board with said flexible printed circuit board warped approximately into a U shape.

10. A lens barrel according to claim 8, wherein said electrical circuit board is substantially fixed to said fixed member.

* * * * *

UNITED STATES PATENT AND TRADEMARK OFFICE
CERTIFICATE OF CORRECTION

PATENT NO. : 5,453,807
DATED : September 26, 1995
INVENTOR(S) : Toshimi Iizuka

It is certified that error appears in the above-indentified patent and that said Letters Patent is hereby corrected as shown below:

Col. 3, line 1.  After "tube" insert -- or member --.

Col. 3, line 2.  Delete "or member".

Signed and Sealed this

Ninth Day of January, 1996

Attest:

BRUCE LEHMAN

Attesting Officer  Commissioner of Patents and Trademarks